United States Patent
Hamilton (10) Patent No.: US 9,091,541 B2
(45) Date of Patent: Jul. 28, 2015

(54) COMPASS

(75) Inventor: Arnott Hamilton, Paisley (GB)

(73) Assignee: Thales Holdings UK PLC, Surrey (GB)

( * ) Notice: Subject to any disclaimer, the term of this patent is extended or adjusted under 35 U.S.C. 154(b) by 573 days.

(21) Appl. No.: 13/283,352

(22) Filed: Oct. 27, 2011

(65) Prior Publication Data
US 2013/0104409 A1 May 2, 2013

(51) Int. Cl.
*G01C 19/38* (2006.01)

(52) U.S. Cl.
CPC ...................................... *G01C 19/38* (2013.01)

(58) Field of Classification Search
CPC ....... G01C 21/16; G01C 19/38; G01C 21/206; G01C 21/3602; G01C 17/30; G01C 17/38; G01C 19/00; G01C 19/5755; G01C 21/20
USPC ..................................................... 33/324, 356
See application file for complete search history.

(56) References Cited

U.S. PATENT DOCUMENTS

| | | | |
|---|---|---|---|
| 4,807,138 A | 2/1989 | Krogmann | |
| 5,247,748 A * | 9/1993 | Hojo et al. | 33/326 |
| 6,785,975 B1 | 9/2004 | Campbell et al. | |
| 7,065,891 B2 * | 6/2006 | Campbell et al. | 33/356 |
| 8,108,171 B2 * | 1/2012 | Judd | 33/356 |
| 2006/0090358 A1 * | 5/2006 | Campbell et al. | 33/356 |
| 2007/0240486 A1 | 10/2007 | Moore et al. | |
| 2011/0066392 A1 * | 3/2011 | Judd | 33/356 |
| 2012/0222320 A1 * | 9/2012 | Roberfroid et al. | 33/324 |
| 2013/0104409 A1 * | 5/2013 | Hamilton | 33/324 |
| 2013/0104410 A1 * | 5/2013 | Wade et al. | 33/361 |
| 2014/0116133 A1 * | 5/2014 | Sheynblat et al. | 73/504.02 |

FOREIGN PATENT DOCUMENTS

| | | |
|---|---|---|
| EP | 1048929 A2 | 11/2000 |
| GB | 2211608 A | 7/1989 |

OTHER PUBLICATIONS

Benliang Li et al, "Study and Simulation on a Dynamic Gyroless North Finder", Mar. 13, 2000, pp. 502-505, XP010376977, Beijing, China.
Guofu Sun et al, "Accelerometer Based North Finding System", Mar. 13, 2000, pp. 399-403, XP010376964, Beijing, China.
European Search Report for EP12155745 dated Dec. 18, 2013.
Search Report for British Application No. GB11186453.9, Feb. 21, 2012.

* cited by examiner

*Primary Examiner* — Yaritza Guadalupe-McCall
(74) *Attorney, Agent, or Firm* — Lowe Hauptman & Ham, LLP (57) ABSTRACT

The invention relates to a compass or direction determination device comprising one or more rotation sensitive sensors and means for rotating the one or more rotation sensitive sensors, wherein the means for rotating is configured to produce two or more rotation speeds of the one or more rotation sensitive sensors during a single direction determination operation.

23 Claims, 4 Drawing Sheets

COMPASS

SCOPE OF INVENTION

The invention relates to a direction determination device or compass, such as a gyro-compass that uses the Coriolis effect to determine True North.

BACKGROUND TO THE INVENTION

Navigational instruments find use in a wide range of applications such as personal or vehicular navigation and mapping systems, missile guidance systems, target location systems, ships and other vessel's compass systems and the like. One such navigational instrument is an electronic compass, such as a gyro-compass.

A problem with these compass systems is determining the direction of True North in a way that is sufficiently compact, accurate and cost effective enough to be deployed in common applications such as navigation or target location equipment in vehicle and man-portable contexts. Existing gyro compass technologies that are capable of acceptable accuracy are generally too large or expensive.

A typical gyro-compass uses an electrically powered, fast spinning member to determine the direction of True North. A particular gyro-compass is the orbiting accelerometer gyro. Such accelerometers would be suitable for general usage if it were not for the exceptionally high rotor speed required to overcome gravitational sensitivity due to drift in accelerometer alignment.

An orbiting accelerometer gyro compass comprises one or more accelerometers mounted on a spinning rotor with the sensitive axis of each accelerometer nominally aligned parallel to the rotor axis about which it orbits. The spinning accelerometers are subject to alternating Coriolis acceleration as they rotate, thereby producing a corresponding alternating output which is proportional to the rate of spin. Misalignment of the accelerometer sensitive axis from the rotor axis results in gravitational sensitivity if the rotor axis is not precisely vertical. While this can be overcome by accurate alignment and calibration, the slightest drift in alignment can cause overwhelming gravitational sensitivity. For example with a rotor speed of 50 Hz, an accelerometer positioned at a radius of 40 mm on the rotor, and the gyro compass tilted at up to 6 degrees, an alignment drift of only 10 micro-radians can induce an error of 0.5 degrees. As the gravitational signal has the same frequency as the Coriolis signal and indeterminate phase, separating these signals is problematic. As a result, a gravity-sensitive bias may exist in the outputs of these devices, to an extent that it is difficult to configure an accurate enough gyro-compass using this technology.

STATEMENTS OF INVENTION

According to a first aspect of the present invention is a compass or direction determination device comprising one or more rotation sensitive sensors and means for rotating the one or more rotation sensitive sensors, wherein the means for rotating is configured to produce two or more rotation speeds of the one or more rotation sensitive sensors during a single direction determination operation.

The compass or direction determination device may be configured to determine a direction from the outputs of the one or more rotation sensitive sensors, the outputs being associated with the two or more rotation sensitive sensor rotation speeds.

At least one of the rotation sensitive sensors may be sensitive to rotation of the Earth. An axis of rotational sensing of at least one and optionally each rotation sensitive sensors is orthogonal to an axis about which the sensor is rotated. At least one of the rotation sensitive sensors may be configured to determine alternating angular acceleration. At least one of the rotation sensitive sensors may be configured to directly measure rotation of the Earth.

At least one and preferably each of the rotation sensitive sensors may comprise an accelerometer. At least one of the rotation sensitive sensors may comprise a sensor configured to directly measure the Earth's rotation rate, such as a liquid angle sensor.

The direction may be True North. The compass or direction determination device may be configured to determine the direction using the Coriolis effect. At least one of the rotation sensitive sensors is configured to measure Coriolis acceleration, which may comprise a linear alternating Coriolis acceleration.

The two or more rotation speeds of the rotation sensitive sensors may comprise at least two rotation speeds of at least one and preferably at least two of the rotation sensitive sensors.

At least one and preferably each accelerometer may be radially spaced from a rotation axis of the compass or direction determination device, i.e. the accelerometers may be rotated at a radial distance from the rotation axis. The compass or direction determination device may be configured such that at least one and preferably each accelerometer orbits the rotation axis at the same rate as they rotate around their own axis.

At least one of the rotation speeds of the at least one rotation sensitive sensor may be in a different rotation direction to at least one of the other rotation speeds of the rotation sensitive sensor(s), which may be an opposite rotation direction, i.e. at least a first rotation speed of the rotation sensitive sensor(s) may be a positive rotation speed whilst at least a second rotation speed of the rotation sensitive sensor(s) may be a negative rotation speed.

At least one rotation speed of the rotation sensitive sensor(s) may comprise a different magnitude to at least one other rotation speed of the rotation sensitive sensor(s).

At least one rotation speed of the rotation sensitive sensor(s) may have the same magnitude as at least one other rotation speed of the rotation sensitive sensor(s) but a different direction or sign, i.e. the direction may be determined from at least a first output of the rotation sensitive sensor(s) when being rotated with a positive rotation speed having a selected magnitude and at least a second output of the rotation sensitive sensor(s) when being rotated with a negative rotation speed having the selected magnitude. The first rotation speed may be in a clockwise or anticlockwise direction and the other rotation speed may be the other of an anticlockwise or clockwise direction.

The means for rotating may be configured to periodically vary the rotational speed of the rotation sensitive sensor(s), which may comprise periodically varying the direction of rotation of the rotation sensitive sensor(s). Each period of rotation may comprise an integer number of rotations.

The system may comprise at least two rotatable rotation sensitive sensors. At least two of the rotation sensitive sensors may be rotatable at the same speed by the means for rotating. The means for rotating may comprise a rotor. At least two of the rotation sensitive sensors may be mounted to the rotor. The means of rotating may comprise a spindle for supporting the rotor. The means of rotating may comprise at least one and preferably at least two bearings for supporting the spindle and/or rotor so that it can rotate. The means of rotating may comprise a motor for rotating the spindle and/or rotor.

At least one of the rotation sensitive sensors may be angled relative to at least one other rotation sensitive sensor. At least one of the rotation sensitive sensors may be orthogonally positioned relative to at least one other rotation sensitive sensor.

When the at least one rotation sensitive sensor comprises at least one accelerometer, the accelerometers may comprise at least one and preferably at least two axial or Coriolis measuring accelerometers. The at least one axial or Coriolis measuring accelerometer may be mounted such that its sensitive axis is aligned or parallel with a rotor axis or rotation axis of the rotor.

Alternatively or additionally, at least one and optionally each of the Coriolis measuring accelerometers may comprise an angular accelerometer, mounted with their rotation-sensitive axis orthogonal to the rotor axis. In this case, as the angular accelerometers are rotated, they experience the alternating angular rate of earth rotation which appears as alternating angular acceleration.

The rotation sensitive sensors may comprise at least one and preferably at least two liquid angle sensors. The liquid angle sensor may comprise a case, such as a cylindrical case. The case may comprise a fluid, such as a magnetic fluid. The liquid angle sensor may comprise a sensing system for determining the differential angular rate between the liquid and the case. The sensing system may be configured to operate using induction and the differential angular rate may be determined using changes in induction. The liquid angle sensor may be configured such that the case is rotated about a longitudinal or cylindrical axis of the case by the means for rotating. The case may be configured to be angularly oscillated or rotated in an oscillating manner. The liquid angle sensor may be configured to be rotated in the vertical axis with its sensitive axis lying horizontal, for example, such that its sensitive axis sweeps round the compass directions in the horizontal plane, i.e. its sensitive axis sweeps round the compass directions in a horizontal plane.

The accelerometers may comprise at least one and preferably at least two transverse or tilt measuring accelerometers. The at least one transverse or tilt measuring accelerometer may be positioned such that its sensitive axis is orthogonal or perpendicular to the rotor axis. At least one of the tilt measuring accelerometers is positioned such that its sensitive axis is orthogonal to at least one other tilt measuring accelerometer, i.e. at least two tilt measuring accelerometers may be mutually orthogonal to each other and both are orthogonal to the rotor axis and the axial or Coriolis measuring accelerometers.

Power and/or signals may be supplied to and/or received from each accelerometer via a rotary connection, such as a slip ring, flexible cable, a rotary transformer, rotary capacitor, rotary electro-optic joint, or the like. The rotary connection may be a non-contact connection. The compass or direction determination device may comprise a multiplexer for separating power and signals. The compass or direction determination device may comprise an amplifier for amplifying the signals received from the accelerometers. For example, the amplifier may be configured to amplify an analogue signal or signals from the accelerometers to a processing range of an analogue to digital converter. The amplifier and/or multiplexer and/or analogue to digital converter may be comprised on or in or supported by the rotor. In this way, amplified and/or multiplexed and/or digital signals originating from the accelerometers may be passed through a minimum of rotary connections, which may help reduce noise in the signals.

The compass or direction determination device may comprise an angular position transducer, such as a rotary optical encoder, for measuring an angle of the rotor and/or at least one accelerometer.

The compass may comprise a recoil device, such as a spring, a magnetic recoil device and/or a regenerative motor, or the like, which may be configured to conserve kinetic energy by storing energy during one rotation direction of the at least one accelerometer and releasing it during another rotational direction of the at least one accelerometer.

The compass may comprise a processor. The processor may be configured to determine the direction from the outputs of the at least one accelerometer whilst being rotated at the two or more accelerometer rotation speeds. The processor may be configured to determine the direction by subtracting the output (or a value or values derived therefrom) of at least one of the accelerometers when being rotated at one of the rotation speeds from the output (or a value or values derived therefrom) of at least one of the accelerometers when being rotated at another of the rotation speeds.

The processor may be configured to control the means for rotating to rotate at the two or more rotation speeds.

The processor may be configured to demodulate the signal from at least one and preferably each axial or Coriolis accelerometer, for example, by multiplying the signal by a synthesized signal having the same shape and/or phase as the Coriolis component to be extracted. The processor may be configured to integrate the product of the signal from the Coriolis accelerometer and the synthesised signal over at least one period of accelerometer rotation speed alternation. The synthesized signal may comprise a demodulating signal, which may preferably have the same shape as the signals to be extracted. The synthesized signal may be sinusoidal. The phase of the synthesized signal may comprise a reference phase, e.g. the phases that the outputs of the rotation sensitive sensor(s) would have with the forward axis of the instrument pointing north, which may not be the actual phases of the outputs of the rotation sensitive sensor(s), which vary with pointing direction. Demodulating the accelerometer outputs using the reference direction phases may enable the actual output phases to be extracted and thus the pointing direction of the instrument to be determined.

The processor may be configured to perform automatic calibration, for example to automatically calibrate for acceleration sensitivity, while it is running normally.

The calibration may comprise determining a gravitational component of the acceleration determined by the at least one Coriolis or axial accelerometer. The calibration may comprise summing the output (or a value or values derived therefrom) of at least one of the Coriolis or axial accelerometers when being rotated at one of the rotation speeds from the output (or a value or values derived therefrom) of at least one of the accelerometers when being rotated at another of the rotation speeds, wherein the result of the summation may be used to determine the gravitational component. The calibration may comprise subtracting the determined gravitational component from the output (or a value or values derived therefrom) of the Coriolis or axial accelerometers.

The gravitational component may be determined for a particular tilt. The calibration may comprise using the outputs of the at least one tilt measuring or transverse accelerometer to calibrate the compass. The outputs of the at least one Coriolis or axial accelerometer may be correlated to the outputs of the at least one tilt measuring or transverse accelerometer, e.g. to obtain a regression factor, which may correspond to the gravitational component at a specified tilt (e.g. pitch and/or roll). The compass may be configured to average regression factors from two consecutive rotations of the rotor in opposing directions to cancel any Coriolis component. The average of the regression factors may represent the cross-axis sensitivity of the Coriolis or axial accelerometers. This calibrated cross-axis sensitivity may be used in future measurements to estimate the gravitational part of the Coriolis or axial accelerometer outputs and cancel at least part of it. Further measurements from consecutive pairs of opposing rotations may be used to refine and update this calibration of cross-axis sensitivity.

According to a second aspect of the invention is a method of determining a direction or bearing, the method comprising:
  providing one or more rotatable rotation sensitive sensors and means for rotating the one or more rotation sensitive sensors;
  rotating at least one of the one or more rotation sensitive sensors at a first rotation speed and obtaining a first output from the at least one rotation sensitive sensors;
  rotating at least one of the one or more rotation sensitive sensors at a second rotation speed and obtaining a second output from the at least one rotation sensitive sensors;
  determining a direction or bearing from at least the first and second outputs.

At least one and preferably each of the rotation sensitive sensors may comprise an accelerometer.

The method may comprise use of or comprise providing a compass or direction determination device having any of the features described above in relation to the first aspect.

According to a third aspect of the present invention is a method of calibrating a compass or direction determining device according to the first aspect, the method comprising determining a gravitational component of an output of one or more rotation sensitive sensors of the compass or direction determining device from the outputs of the one or more rotation sensitive sensors associated with two or more rotation sensitive sensor rotation speeds.

The method may comprise summing the output (or a value or values derived therefrom) of at least one of the rotation sensitive sensors when being rotated at one of the rotation speeds from the output (or a value or values derived therefrom) of at least one of the rotation sensitive sensors when being rotated at another of the rotation speeds, wherein the result of the summation may be used to determine the gravitational component. At least one and preferably at least two rotation sensitive sensors may comprise a Coriolis or axial accelerometer. The method may comprise subtracting the determined gravitational component from the output (or a value or values derived therefrom) of the Coriolis or axial accelerometers.

The method may comprise determining the gravitational component for a particular tilt. The method may comprise using the outputs of the at least one tilt measuring or transverse accelerometer to calibrate the compass or direction determining device. The outputs of the at least one Coriolis or axial accelerometer may be correlated to the outputs of the at least one tilt measuring or transverse accelerometer, e.g. to obtain a regression factor, which may correspond to the gravitational component at a specified tilt (e.g. pitch and/or roll). The method may comprise averaging regression factors from two consecutive rotations of the rotor in opposing directions to cancel any Coriolis component. The average of the regression factors may represent the cross-axis sensitivity of the Coriolis or axial accelerometers. This calibrated cross-axis sensitivity may be used in future measurements to estimate the gravitational part of the Coriolis or axial accelerometer outputs and cancel at least part of it. Further measurements from consecutive pairs of opposing rotations may be used to refine and update this calibration of cross-axis sensitivity.

According to a fourth aspect of the present invention is a mapping and/or navigation device comprising the compass of the first aspect and/or configured to implement the methods of the second and/or third aspect.

According to a fifth aspect of the present invention is a guidance system comprising the compass of the first aspect and/or configured to implement the methods of the second and/or third aspect.

According to a sixth aspect of the present invention is a computer program product configured to implement the apparatus of the first, fourth and/or fifth aspects or the methods of the second and/or third aspect.

According to an seventh aspect of the present invention is a computer readable medium comprising the computer program product of the sixth aspect or processing apparatus suitably programmed with or running the computer program product of the sixth aspect.

Features analogous to those described in relation to any of the above aspects of invention may also be applicable to any of the other aspects of invention. Features analogous to those described above in relation to an apparatus may also be provided in a corresponding method and vice versa.

Advantages of these embodiments are set out hereafter, and further details and features of each of these embodiments are defined in the accompanying dependent claims and elsewhere in the following detailed description.

BRIEF DESCRIPTION OF THE DRAWINGS

At least one embodiment of the invention will now be described, by way of example only, with reference to the accompanying drawings, in which.

DETAILED DESCRIPTION OF THE DRAWINGS

Figure 1:
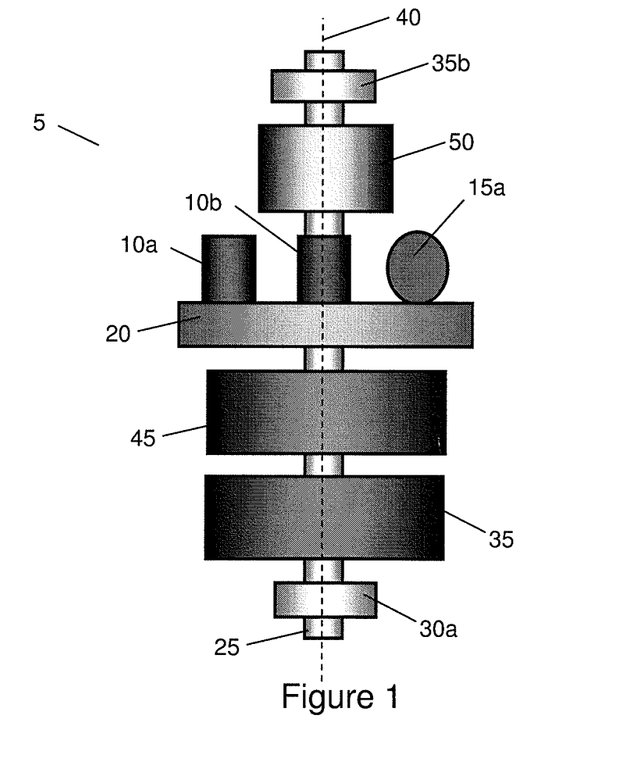
FIG. 1 is a side view of a gyro-compass.

FIG. 1 shows a gyro-compass mechanism 5 comprising a pair of axial or Coriolis accelerometers 10a, 10b and a pair of transverse or tilt determining accelerometers 15a, 15b mounted on a rotor 20. The rotor 20 is mounted on a spindle 25, the spindle 25 comprising a bearing 30a, 30b at each end such that the spindle 25 is mounted or mountable to a housing (not shown) so that it can rotate. The gyro-compass 5 further comprises an electric motor 35 for rotating the spindle 25 around its longitudinal axis 40. The gyro-compass 5 also comprises an angle encoder 45. The angle encoder is operable to determine a rotation angle and thereby a rotation speed of the spindle 25 and is also usable to synthesise demodulating waveforms. A rotating connection 50 such as a slip ring is provided, along with appropriate connections, such that the accelerometers 10a, 10b, 15a, 15b can be connected to a controller (not shown) so that the controller can receive the output from the accelerometers 10a, 10b, 15a, 15b. The rotating connection 50 also allows power and control signals to be supplied to the accelerometers 10a, 10b, 15a, 15b, angle encoder 45 and motor 35 by the controller.

Figure 2:
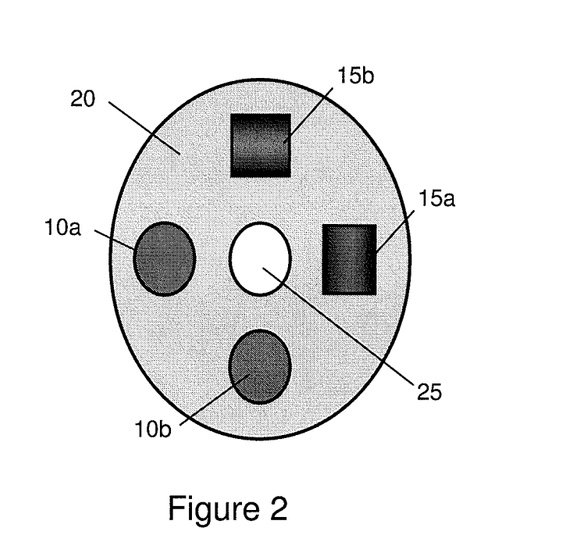
FIG. 2 is a top view of a rotor of the gyro-compass of FIG. 1.

As shown in FIGS. 1 and 2, the pair of Coriolis accelerometers 10a, 10b are axially aligned, in other words mounted such that the sensitive directions of the Coriolis accelerometers 10a, 10b are parallel (i.e. aligned) with the rotor axis. As is known in the art, the sensitive direction of the accelerometers is a direction that the accelerometers 10a, 10b are configured to detect, or be most sensitive to, accelerations in. In this case, the rotor axis is the longitudinal axis 40 of the spindle 25.

The tilt determining accelerometers 15a, 15b are transversely mounted, i.e. oriented such that the sensitive directions of the tilt determining accelerometers 15a, 15b are orthogonal to the rotor axis 40 and also such that the sensitive direction of one of the transversely mounted tilt accelerometers 15a is orthogonal to the sensitive direction of the other transversely mounted tilt accelerometer 15b. The transversely mounted tilt accelerometers 15a, 15b are configured to detect tilt, i.e. the pitch or roll, of the gyro-compass 5.

Accelerations in the axial and transverse directions are determined using the axial and transversely mounted accelerometers 10a, 10b, 15a, 15b. The axial accelerometers 10a, 10b are oriented so as to detect alternating acceleration due to the Coriolis effect that results from rotation of the Earth, which can in turn be used to determine the direction of True North. In particular, the axial accelerometers 10a, 10b are subject to alternating Coriolis acceleration due to the Earth's rotation, and thereby produce a corresponding alternating output from the axial or Coriolis accelerometers that is proportional to the rate of spin of the rotor 20.

Provision of a pair of axial accelerometers 10a, 10b allows the signal to noise ratio of the measurement to be increased and to advantageously give smooth continuous sensing with no sensing drop-out position. However, it will be appreciated that fewer axial accelerometers 10a, 10b may be used to reduce cost at the expense of signal to noise ratio or more axial accelerometers 10a, 10b may be provided in order to increase the signal to noise ratio at the expense of cost and complexity.

The direction of True North is determined by sensing alternating Coriolis acceleration induced by rotation of the Earth in the rotating axially aligned accelerometers 10a, 10b. The Coriolis acceleration measured by the axially aligned accelerometers 10a, 10b varies sinusoidally with a period equal to that of the rotation of the rotor 20. The direction of True North is determined from the phase of the axial accelerometer 10a, 10b output relative to the rotor 20 angular position as determined by the angle encoder 45, as described in detail below.

Figure 3A:
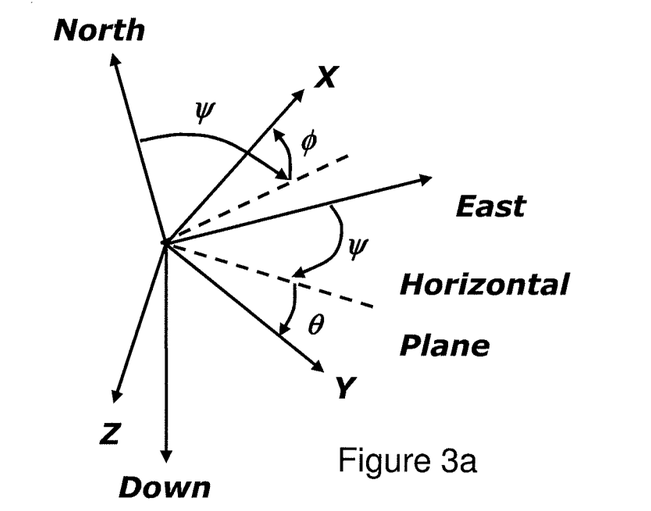
FIGS. 3a and 3b show the axes and angles of the device.
Figure 3B:
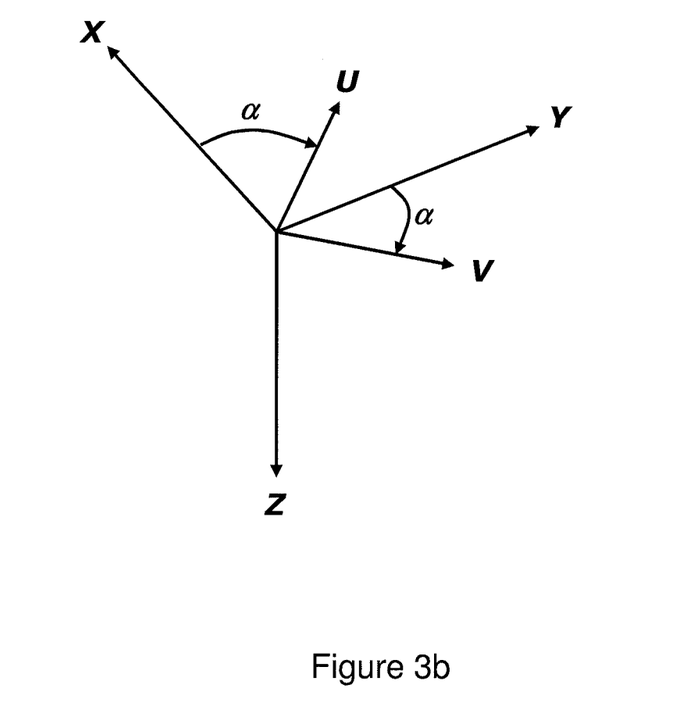

A key to the symbols used below is provided as an appendix at the end of the detailed description of the drawings. FIGS. 3a and 3b show the axes and angles used, wherein X, Y, Z indicate a gyro-compass 5 body frame, U indicates a rotationally sensitive axis of single or first axial accelerometers on plane X-Y, $\alpha$ is the rotor angle, $\psi$ is the heading, $\phi$ is the pitch and $\theta$ is the roll.

For simplicity, the angles of roll $\theta$, pitch $\phi$ and accelerometer misalignment $\delta$, while finite, are assumed to be small enough to allow "small-angle" geometric approximation.

The orbiting Coriolis accelerometers will detect sinusoidal Coriolis acceleration $a_c$:

$$a_c = \omega_e r_o \omega_o \cos(\alpha + \psi)\cos\lambda$$
$$= k_c \cos(\alpha + \psi)$$

where $$k_c = \omega_e r_o \omega_o \cos\lambda$$

The signal is quadrature demodulated by the sine and cosine of orbit angle to extract the north and east components of heading $\psi$ then integrated over an integer number of revolutions N to achieve statistical noise reduction without bias:

$$m_{cs} = k_c \int_0^{2N\pi} \cos(\alpha+\psi)\sin\alpha\, d\alpha = -N\pi k_c \sin\psi$$

$$m_{cc} = k_c \int_0^{2N\pi} \cos(\alpha+\psi)\cos\alpha\, d\alpha = N\pi k_c \cos\psi$$

However, the acceleration measured using the axial accelerometers 10a, 10b may also contain a component due to gravitational acceleration. Misalignment of the accelerometer sensitive axis from the rotor axis 40 results in gravitational sensitivity in the Coriolis measurement if the rotor axis 40 is not precisely vertical. While this can be overcome by accurate alignment and calibration, the slightest drift in alignment can cause overwhelming gravitational sensitivity. For example, for a rotor speed of 50 Hz and an accelerometer at a radius of 40 mm and with the gyro-compass tilted at up to 6 degrees, an alignment drift of only 10 micro-radians could induce an error of 0.5 degrees. The gravitational signal has the same frequency as the Coriolis signal and indeterminate phase, thereby making the gravitational and Coriolis components of the measured acceleration difficult to separate. This could cause a gravity-sensitive bias to exist in the output of the gyro-compass, which may make it difficult to achieve a high degree of accuracy.

The effect of the gravitational component is described in detail as follows.

If the sensitive axes of the axial accelerometers 10a, 10b are misaligned from the orbit axis by angle $\delta_u$, $\delta_v$ in the u and v axes (the planar axes of the rotor 20, which lie in the orbital plane) and the orbit axis is misaligned from the geodetic normal (vertical) by roll $\theta$ and pitch $\phi$, a sinusoidal gravitational signal $a_g$ appears in the measurement which interferes with the Coriolis signals:

$$a_g = g\sin\phi(\delta_u\cos\alpha - \delta_v\sin\alpha) + g\sin\theta(\delta_u\sin\alpha + \delta_v\cos\alpha)$$
$$= k_g \cos(\alpha + \gamma)$$

This gravitational signal gets demodulated and integrated in the same way as the Coriolis signal, producing 2 directional components:

$$m_{gc} = k_g \int_0^{2N\pi} \cos(\alpha+\gamma)\cos\alpha\, d\alpha$$

$$m_{gs} = k_g \int_0^{2N\pi} \cos(\alpha+\gamma)\sin\alpha\, d\alpha$$

As the desired Coriolis acceleration increases with spin rate, while the nuisance gravitational acceleration is constant regardless of spin rate, one option for increasing the Coriolis component relative to the gravitational component is to use a high spin rate. However, this may lead to high power consumption and short life due to slip-ring 50 and bearing 30a, 30b wear, unless high cost non-contact technology is used.

The preferred solution to the above problem according to an embodiment of the present invention is to drive the rotor 20 in such a way as to cancel the gravitational component, regardless of alignment drift, thereby achieving a good accuracy without the need for high spin rate and consequently extending life without incurring additional cost.

Figure 4A:
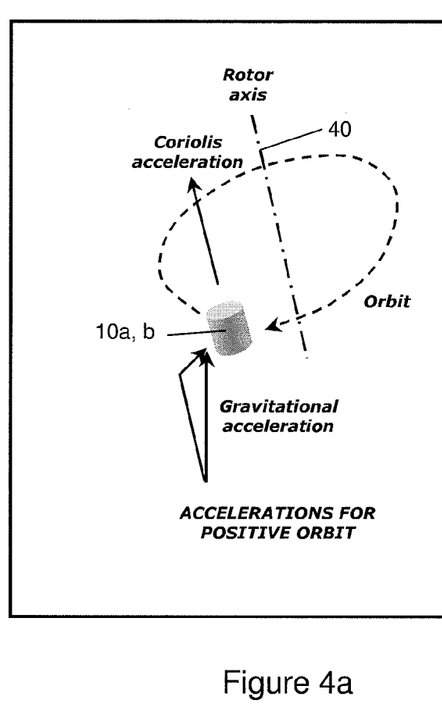
FIG. 4a is a vector diagram showing the accelerations experienced by the accelerometers of the gyro-compass of FIG. 1 when rotating in a positive or clockwise rotation direction.
Figure 4B:
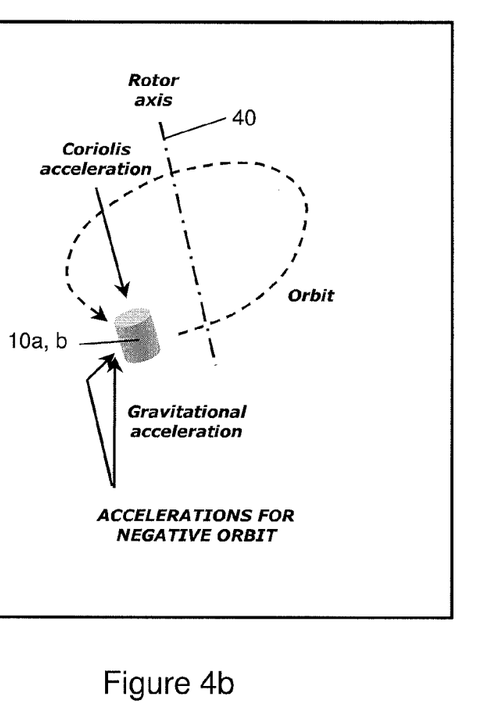
FIG. 4b is a vector diagram showing the accelerations experienced by the accelerometers of the gyro-compass of FIG. 1 when rotating in a negative or anticlockwise rotation direction.
Figure 5:
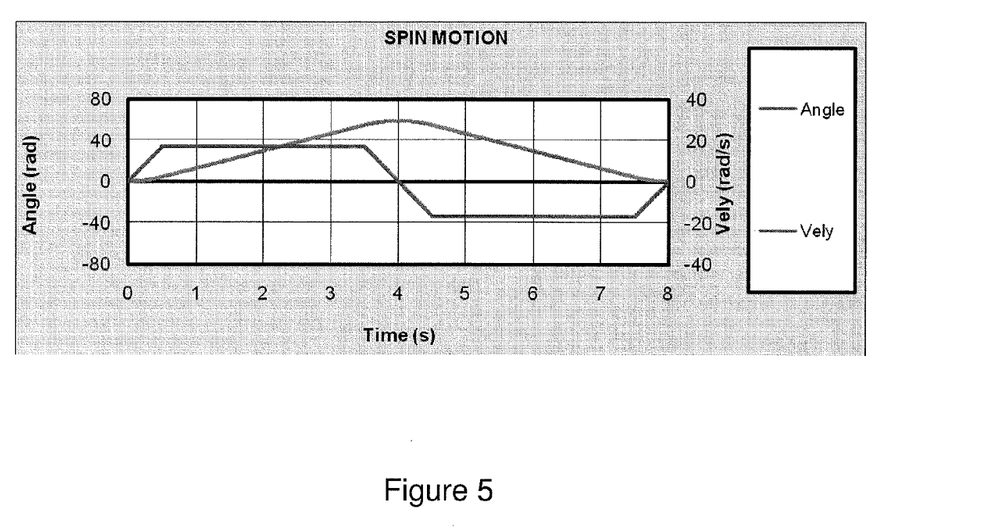
FIG. 5 shows a relationship between angle and velocity of the rotor of FIG. 2 according to an operating scheme for minimising gravitational effects on direction determination.
Figure 6:
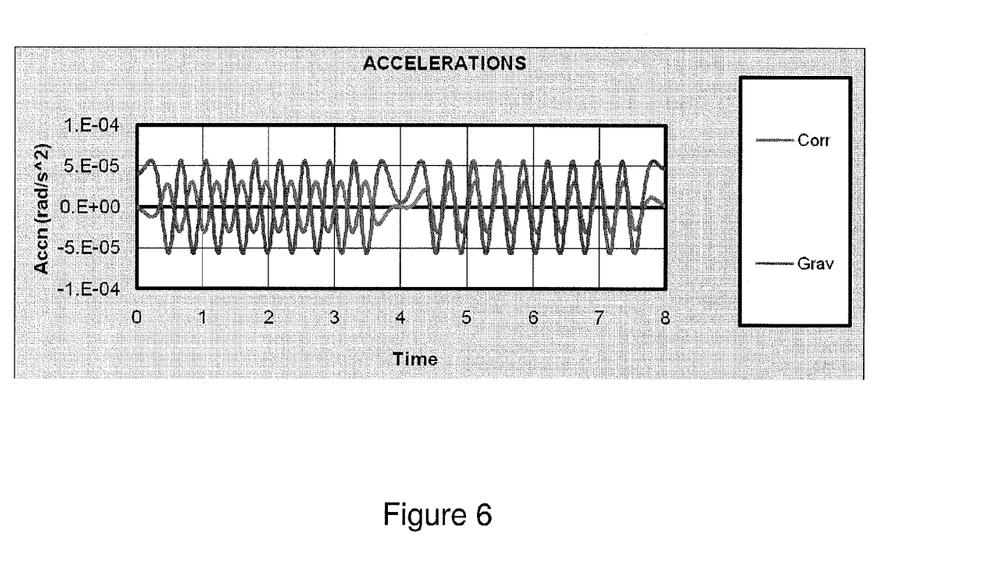
FIG. 6 shows a comparison of the components of acceleration detected by axial accelerometers of the gyro-compass of FIG. 1 when subjected to the rotation scheme of FIG. 5.

The gyro-compass 5 according to an embodiment of the present invention uses periodic variation of the rotor speed. The amplitude of the Coriolis acceleration sinusoid varies directly with rotor speed whilst that of the gravitation acceleration is constant. Therefore, by varying the rotor speed and analysing the output of the axial or Coriolis accelerometers at each speed, the Coriolis and gravitational components of the detected acceleration become separable, for example by taking a difference between the accelerometer signals associated with each of the varying rotation speeds, which allows the gravitational component to be effectively eliminated or reduced. Although any two differing rotational speeds may be used to eliminate or vary the gravitational component whilst preserving the Coriolis component, periodic reversal of the rotor spin direction between rotation speeds of the same magnitude but opposite signs/spin directions (i.e. switching between a rotational speed of +ω and a rotational speed of −ω), as shown in FIG. 5, can preferably be used to allow optimal separation of the gravitational and Coriolis components by minimising the gravitational component whilst maximising the Coriolis component. When the direction of spin of the rotor is reversed whilst keeping the magnitude of rotor speed constant, the Coriolis acceleration waveform is the inverse of that of the forward spin, while the gravitational component is the same, as shown in FIGS. 4a, 4b and FIG. 6. Taking the difference between the forward and reverse spin waveforms results in cancellation of the gravitational part, leaving a pure Coriolis sum with a relatively high signal to noise ratio. Removal of the gravitational component in this way facilitates lower spin rate and sufficient accuracy in the gyro-compass.

In particular, during each direction of rotation, the rotor 20 completes an integer number of rotations. For each measurement, the rotor 20 is rotated for the predetermined number of rotations in one rotational direction and a corresponding number of rotations in a reverse rotational direction. Power is conveyed to the accelerometers 10a, 10b, 15a, 15b and signals are taken from the accelerometers 10a, 10b, 15a, 15b using the rotating connection 50. The alternating signals from the axial accelerometers 10a, 10b together with the rotor position measurements determined using the angle encoder 45 are processed to determine the direction of True North from the phase of the Coriolis acceleration relative to the rotor angle. The signal from each accelerometer 10a, 10b is demodulated by multiplying it by a synthesized signal having the same shape and phase as the Coriolis component to be extracted and integrating this product over at least one period of spin alternation. The synthesised or demodulating signals have preferably but not necessarily the same shape as the signals to be extracted, i.e. sinusoidal. The phases of the synthesized signals are reference phases, i.e. the phases that the outputs of the axial or Coriolis accelerometers 10a, 10b would have with the forward axis of the instrument pointing north and not in general the actual phases of the accelerometer outputs, which vary with pointing direction. Demodulating the accelerometer outputs using the reference direction phases enables the actual output phases to be extracted and thus the pointing direction of the instrument to be determined. The unwanted gravitational components of the measured acceleration all integrate to zero over this period and are thus suppressed.

This is described in detail as follows.

For a clockwise or positive orbit of the axial or Coriolis accelerometers 10a, 10b looking downwards, the composite measurement made by the axial or Coriolis accelerometers is:

$m_{cp} = m_{gc} + m_{gs}$ $m_{sp} = m_{gs} + m_{cs}$

For a counter-clockwise or negative orbit, the phase of the Coriolis component is reversed, i.e. $k_c$ is negated:

$m_{sn} = m_{gs} - m_{cs}$ $m_{cn} = m_{gc} - m_{cc}$

The measurement is taken as the difference between the positive and negative orbit measurements, in which the nuisance gravity component of the measurement disappears:

$m_c = m_{cp} - m_{cn} = 2\,m_{cc} = 2\,N\pi k_c \cos\psi$ $m_s = m_{sp} - m_{sn} = 2\,m_{cs} = -2\,N\pi k_c \sin\psi$ Finally the heading is resolved from the directional measurements:

$\psi = a\tan 2(m_c, -m_s)$ where the function $a\tan 2(x, y)$ is a method of processing the function $\tan^{-1}(y/x)$ that avoids singularities.

The true north direction as computed above may be corrected for tilt of the rotor axis 40 using the transversely mounted accelerometers 15a, 15b. The accelerations measured by the transversely mounted accelerometers 15a, 15b can be used to measure the tilt and to facilitate calibration of axis misalignment of the axial accelerometers 10a, 10b. This serves to minimise the dynamic range of the measurements and thereby errors in the measurement.

The gyro-compass 5 can be automatically calibrated for acceleration sensitivity whilst in operation. The automatic calibration comprises correlating the outputs of the axial accelerometers 10a, 10b to the outputs of the transverse accelerometers 15a, 15b to obtain a regression factor. Regression factors from two consecutive rotations in opposing directions are averaged to cancel any Coriolis component to the acceleration. The average of the regression factors represents the cross-axis sensitivity of the axial accelerometers 10a, 10b. This calibrated cross-axis sensitivity is then used in future measurements to estimate the gravitational part of the axial accelerometer outputs, for example by summing the output of the axial accelerometers 10a, 10b over an even number of positive and negative rotations, and thereby cancelling a large part of the gravitational part of the accelerometer outputs. Further measurements from consecutive pairs of opposing rotations are used to refine and update this calibration of cross-axis sensitivity.

This calibration process is described in detail as follows.

The misalignment of the axial accelerometers 10a, 10b is calibrated with the gyro-compass 5 intentionally tilted or inclined. The inclination is detected in terms of roll $\theta_c$ and pitch $\phi_c$ using the tilt accelerometers 15a, 15b. Subject to the gravity field, the tilt accelerometers 15a, 15b will detect a sinusoidal acceleration $a_i$ due to their rotation in the inclined plane:

$a_i = (\cos\alpha\sin\phi_c - \sin\alpha\sin\theta_c)/g$

The roll and pitch components of the tilt angle under calibration are measured by quadrature demodulation, integrated over N orbits:

$\theta_k = -\int_0^{2N\pi} a_i \sin\alpha\, d\alpha$ $\phi_k = \int_0^{2N\pi} a_i \cos\alpha\, d\alpha$ The accelerometer misalignment $(\delta_u, \delta_v)$ is estimated by adding the measurements of the Coriolis accelerometers under positive and negative rotations, where the Coriolis component is cancelled out, leaving the gravitational component, then scaling to the measured tilt components:

$$\delta_u = (m_{cp} + m_{cn})/\sin \phi_c$$

$$\delta_v = (m_{sp} + m_{sn})/\sin \theta_c$$

This misalignment estimate is used to modify future Coriolis accelerometer signals by removing or minimising the determined gravitational component:

$$a_c = a_{co} - g\, \delta_u(\cos\alpha\sin\phi_k - \sin\alpha\sin\theta_k) + g\, \delta_v(\cos\alpha\sin\theta_k + \sin\alpha\sin\phi_k)$$

It will be appreciated that such a gyro compass 5 can be used in a wide range of applications such as in-car or hand held navigation and/or mapping systems, or in guidance systems such as those in use for ships, aircraft, missiles unmanned vehicles and the like.

It will be appreciated that although an advantageous example of the invention is described above, variations to the above example are contemplated.

The specific example given above uses accelerometers. It will be appreciated by a skilled worker in the field that there are many possible suitable accelerometer types and configurations that are capable of measuring acceleration. A preferred accelerometer is a piezo-electric accelerometer due to it's very low noise. This accelerometer comprises a slug mass connected to the accelerating platform via a piezo-electric ligament. However, it will be appreciated that any configuration of slug mass and force sensor could behave as an accelerometer. In addition, optical devices could also be used as accelerometers. It would also be possible to have angular accelerometers mounted with their rotation-sensitive axis orthogonal to the rotor axis in place of the axially mounted Coriolis accelerometers described above. As these angular accelerometers are rotated they experience the alternating angular rate of earth rotation which appears to them as alternating angular acceleration. In general, any means of measuring linear or angular acceleration could potentially be used as an accelerometer in the device described above.

In addition, in place of the axial or Coriolis measuring accelerometers described above, it may be possible to substitute other sensors, for example sensors that use direct measurement of earth rotation rate, such as liquid angle sensors. These sensors effectively measure the rate of earth rotation by direct inertial slug action, rather than through Coriolis acceleration. The liquid angle sensors comprise a cylindrical case containing a magnetic liquid. When the case is rotated about the cylindrical axis, the liquid initially remains stationary and the differential angular rate between liquid and case can be measured by electromagnetic induction. Eventually the liquid attains the same angular rate as the case due to viscous drag. If the case is oscillated in an angular sense, the alternating rate can be measured continuously as the liquid never catches up with the case, provided the frequency of oscillation is above a lower cut-off frequency of the device. If the sensor is rotated in the vertical axis with its sensitive axis lying horizontal, i.e. its sensitive axis sweeping round the compass directions in the horizontal plane, the case is subject to an alternating component of angular rotation rate of the earth in the horizontal plane at the particular latitude. When it is pointing north it senses a small clockwise rotation and when pointing south it senses a small counter-clockwise rotation. In practice, these devices appear to have a significant acceleration or gravitational sensitivity, which may be due for example to temperature gradients or non-homegeneity of composition in the liquid. It will be appreciated that the above method of alternating contra-rotation of the liquid angle sensors could also be used to eliminate such gravitational effects in systems that use liquid angle sensors. An example of such a liquid angle sensor is produced by Applied Technology Associates (ATA sensors).

The system described above advantageously uses two orthogonal axial or Coriolis measuring accelerometers. However, it will be appreciated by a skilled person that the concept could work with only one accelerometer. However, two accelerometers pitched at 90 degrees on a spinning disk advantageously give smooth continuous sensing. An accelerometer orbiting in the horizontal plane only measures axial Coriolis acceleration due to its east/west component of motion, i.e. its output is (a sin $\alpha$) where a is the Coriolis acceleration it experiences when travelling east and $\alpha$ is the direction of travel relative to east. So if two accelerometers are pitched at 90 degrees on the spinning disk, there is always at least one moving with a non-zero east/west component of velocity so there is no drop-out position. By modulating the accelerometer outputs by the sine of their direction of travel relative to the base of the instrument, the sum of the modulated outputs is constant, regardless of the angular position of the disk. If the angular position a of the disk is measured as the angular position of a first accelerometer relative to the forward axis of the base of the instrument then the angular position of the orthogonal accelerometer is ($\alpha+\pi/2$). The sum of the modulated outputs from A and B is then: a $\sin^2\alpha + a \sin^2(\alpha+\pi/2) = a(\sin^2\alpha+\cos^2\alpha)=a$.

For example, although the above example advantageously comprises a single rotor 20 that it rotated in opposite directions in order to eliminate or at least substantially reduce the gravitational component of the measured acceleration, it will be appreciated that the same effect may be obtained by rotating the rotor 20 at rotational speeds having varying magnitudes and not necessarily in opposite directions. This process may comprise, for example, use of simultaneous equations or a Kalman filter algorithm to solve for and remove the gravitational component. In addition, although in the above example, the gyro-compass 5 comprises a single rotor 20 and set of accelerometers 10a, 10b, 15a, 15b, it will be appreciated that a plurality of such rotors/accelerometers may be provided. For example, one rotor could be rotated at the first rotational speed and the second rotor could be rotated at the second rotational speed.

Use of data taken from two different speeds of the same rotor allows gravity signals to be eliminated from the measurement through use of simultaneous equations since, in general, two separate rotors would have different accelerometer misalignments. However, using more than one rotor may also provide advantages, for example, to cancel the reaction effect during rotation reversal, which could otherwise be disruptive, i.e. two rotors could achieve cancellation of reaction by accelerating in opposition directions simultaneously. In addition, a plurality of accelerometers could be used to increase statistical signal to noise ratio.

Optionally, the measurements from accelerometers on both rotors could be combined to cancel out the gravitational component. Alternatively, both rotors could be rotated at two or more differing rotational speeds and the measurements from the accelerometers of each rotor used to determine the Coriolis acceleration. Furthermore, whilst specific components such as slip rings 50 and angle encoders 45 are described, it will be appreciated by a skilled worker in the field that suitable alternatives such as a limited rotation flexible cable, optical or magnetic angle encoders, angle resolvers, inductosyns and Hall-effect potentiometers may be used. Similarly, whilst the example described above is provided with two axially oriented accelerometers 10a, 10b and two transversely mounted accelerometers 15a, 15b, it will be appreciated that more or less axial and/or transverse accelerometers 10a, 10b, 15a, 15b can be used. Indeed, it is conceivable that no transverse accelerometers 15a, 15b could be used to provide a simplistic or low cost version of the gyro-compass 5 that does not comprise the calibration feature described above. Although the above example determines direction based on the output of accelerometers rotated at two speeds, it will be appreciated that accelerometer output associated with more than two speeds may be used. Preferably an even number of speeds may be used, preferably in matched pairs of speeds comprising positive and negative rotational speeds of the same magnitude but opposite directions. Therefore, it will be appreciated that the above specific description is provided by way of example only and that the scope of the invention is defined by the claims.

APPENDIX: Key to Symbols Used

Symbols
$a_c$ Coriolis acceleration
$a_{co}$ Output of Coriolis accelerometer
$a_g$ Gravitational acceleration
$a_i$ Inclination acceleration
$m_{cc}$ Coriolis component of integrated cosine demodulation
$m_{cs}$ Coriolis component of integrated sine demodulation
$m_{gc}$ Gravitational component of integrated cosine demodulation
$m_{gs}$ Gravitational component of integrated sine demodulation
$m_{cp}$ Integrated cosine demodulation under positive rotation
$m_{sp}$ Integrated sine demodulation under positive rotation
$m_{cn}$ Integrated cosine demodulation under negative rotation
$m_{sn}$ Integrated sine demodulation under negative rotation
$m_c$ Integrated cosine demodulation
$m_s$ Integrated sine demodulation
$\omega_e$ Earth rotation rate
$\omega_0$ Accelerometer Orbit rate
$r_0$ Accelerometer Orbit radius
$\theta$ Roll angle
$\theta_k$ Roll component of tilt under calibration
$\phi$ Pitch angle
$\phi_k$ Pitch component of tilt under calibration
$\psi$ Heading angle
$\delta_u$ Misalignment of accelerometer from orbit axis in direction u
$\delta_v$ Misalignment of accelerometer from orbit axis in direction v
g Gravity field
$\alpha$ Relative Orbit angle
$\lambda$ Latitude
$\gamma$ Phase of the alternating gravitation acceleration

The invention claimed is:

1. A direction determination device comprising one or more rotation sensitive sensors and means for rotating the one or more rotation sensitive sensors, wherein the means for rotating is configured to produce two or more rotation speeds of the one or more rotation sensitive sensors during a single direction determination operation,
wherein the direction determination device is configured to determine a direction using the Coriolis effect.

2. The direction determination device according to claim 1, wherein at least one of the one or more rotation sensitive sensors comprises an accelerometer.

3. The direction determination device according to claim 2, wherein the at least one accelerometer comprises one or more axial or Coriolis measuring accelerometers mounted such that a sensitive axis of the one or more axial or Coriolis accelerometers is aligned or parallel with a rotor axis or a rotation axis of a rotor.

4. The direction determination device according to claim 3, wherein at least one of the one or more rotation sensitive sensors comprises at least one transverse or tilt measuring accelerometer oriented such that a sensitive axis of the at least one transverse or tilt measuring accelerometer is orthogonal or perpendicular to the rotor axis, wherein outputs of the at least one Coriolis or axial accelerometer are correlated to outputs of the at least one tilt measuring or transverse accelerometer.

5. The direction determination device according to claim 2, wherein the at least one accelerometer comprises at least one transverse or tilt measuring accelerometer oriented such that a sensitive axis of the at least one transverse or tilt measuring accelerometer is orthogonal or perpendicular to a rotor axis.

6. The direction determination device according to claim 5, wherein the at least one transverse or tilt measuring accelerometer is positioned such that that a sensitive axis of the transverse or tilt measuring accelerometer is orthogonal to a sensitive axis of at least one other transverse or tilt measuring accelerometer.

7. The direction determination device according to claim 1, wherein the direction determination device is configured to determine the direction from outputs of the one or more rotation sensitive sensors, the outputs being associated with the two or more rotation sensitive sensor rotation speeds.

8. The direction determination device according to claim 1, wherein at least one of the rotation speeds of the one or more rotation sensitive sensors is in a different rotation direction to at least one of the other rotation speeds of the one or more rotation sensitive sensors.

9. The direction determination device according claim 8, wherein at least one of the rotation speeds of the one or more rotation sensitive sensors is in an opposite rotation direction to at least one of the other rotation speeds of the the one or more rotation sensitive sensors.

10. The direction determination device according to claim 1, wherein the means for rotating is configured to periodically vary the rotational speed of the one or more rotation sensitive sensors.

11. The direction determination device according to claim 1, wherein the direction determination device comprises at least two rotatable rotation sensitive sensors.

12. The direction determination device according to claim 11, wherein the at least two rotatable rotation sensitive sensors are rotatable at the same speed by the means for rotating.

13. The direction determination device according to claim 1, wherein at least one of the one or more rotation sensitive sensors is angled relative to at least one other of the one or more rotation sensitive sensors.

14. The direction determination device according to claim 1, wherein at least one of the one or more rotation sensitive sensors is orthogonally oriented relative to at least one other of the one or more rotation sensitive sensors.

15. The direction determination device according to claim 1, further comprising a recoil device configured to store energy during one rotation direction and releasing it during another rotational direction.

16. The direction determination device according to claim 1, further comprising a processor configured to determine the direction from an output of at least one of the one or more rotation sensitive sensors whilst the at least one of the one or more rotation sensitive sensors is being rotated at the two or more rotation speeds by subtracting an output or a value or values derived therefrom of at least one of the one or more rotation sensitive sensors when being rotated at one of the rotation speeds from an output or a value or values derived therefrom of at least one of the one or more rotation sensitive sensors when being rotated at another of the rotation speeds.

17. The direction determination device according to claim 1, wherein the direction determination device is configured to perform automatic calibration by determining a gravitational component of an acceleration of at least one Coriolis or axial accelerometer.

18. The direction determination device according to claim 17, wherein the calibration comprises summing an output or a value or values derived therefrom of at least one accelerometer when being rotated at one of the rotation speeds with an output or a value or values derived therefrom of at least one accelerometer when being rotated at another of the rotation speeds, wherein a result of the summation is used to determine the gravitational component.

19. A method of determining a direction or bearing, the method comprising the steps of:
    providing one or more rotatable rotation sensitive sensors and means for rotating the one or more rotation sensitive sensors;
    rotating at least one of the one or more rotation sensitive sensors at a first rotation speed and obtaining a first output from the at least one rotation sensitive sensors;
    rotating at least one of the one or more rotation sensitive sensors at a second rotation speed and obtaining a second output from the at least one rotation sensitive sensors;
    determining a direction or bearing from at least the first and second outputs.

20. A method of calibrating a direction determining device, the direction determining device comprising one or more rotation sensitive sensors and means for rotating the one or more rotation sensitive sensors, wherein the means for rotating is configured to produce two or more rotation speeds of the one or more rotation sensitive sensors during a single direction determination operation, the method comprising determining a gravitational component of an output of one or more rotation sensitive sensors of the direction determining device from outputs of the one or more rotation sensitive sensors associated with two or more rotation sensitive sensor rotation speeds.

21. The method of claim 20, the method comprising summing an output or a value or values derived therefrom of at least one of the one or more rotation sensitive sensors when being rotated at one of the rotation speeds with an output or a value or values derived therefrom of at least one of the one or more rotation sensitive sensors when being rotated at another of the rotation speeds, wherein a result of the summation is used to determine the gravitational component.

22. The method of claim 21, wherein at least one of the one or more rotation sensitive sensors of the direction determination device comprises a Coriolis or axial accelerometer and the method comprises subtracting the determined gravitational component from an output or a value or values derived therefrom of the Coriolis or axial accelerometer.

23. The method of claim 20, wherein the method comprises determining the gravitational component for a particular tilt and wherein the method comprises using outputs of at least one tilt measuring or transverse accelerometer of the direction determining device to calibrate the direction determining device.

* * * * *